United States Patent
Kim et al.

(10) Patent No.: US 10,739,515 B2
(45) Date of Patent: Aug. 11, 2020

(54) WAVEGUIDE HAVING LIGHT SHIELDING FILM FORMED THEREON AND MANUFACTURING METHOD THEREFOR

(71) Applicant: LG Chem, Ltd., Seoul (KR)

(72) Inventors: A-Reum Kim, Daejeon (KR);
Jae-Hyun Yoo, Daejeon (KR);
Sung-Eun Park, Daejeon (KR);
Joon-Hyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/332,247

(22) PCT Filed: Nov. 23, 2017

(86) PCT No.: PCT/KR2017/013382
§ 371 (c)(1),
(2) Date: Mar. 11, 2019

(87) PCT Pub. No.: WO2018/110849
PCT Pub. Date: Jun. 21, 2018

(65) Prior Publication Data
US 2019/0285794 A1   Sep. 19, 2019

(30) Foreign Application Priority Data

Dec. 14, 2016  (KR) .................. 10-2016-0170797

(51) Int. Cl.
*G02B 6/34* (2006.01)
*G02B 6/10* (2006.01)
(Continued)

(52) U.S. Cl.
CPC .................. *G02B 6/10* (2013.01); *C09C 1/46* (2013.01); *C09C 1/48* (2013.01); *G02B 1/04* (2013.01)

(58) Field of Classification Search
CPC .. G02B 6/10; G02B 1/04; G02B 6/005; C09C 1/46; C09C 1/48
See application file for complete search history.

(56) References Cited

U.S. PATENT DOCUMENTS 4,830,447 A * 5/1989 Kamiyama ............. G02F 1/377
359/328
6,608,660 B1 * 8/2003 Okamoto .......... G02F 1/133512
349/106
(Continued)

FOREIGN PATENT DOCUMENTS

AU  2018264080 A1  12/2018
CA  2874812 A1  12/2013
(Continued)

OTHER PUBLICATIONS

Korean Search Report for KR10-2016-0170797 dated Jun. 1, 2017.
(Continued)

*Primary Examiner* — Ellen E Kim
(74) *Attorney, Agent, or Firm* — Lerner, David, Littenberg, Krumholz & Mentlik, LLP

(57) ABSTRACT

A waveguide having a light-shielding film formed on a cut surface of an edge side of the planar waveguide, the light-shielding film having a thickness of 2 to 10 μm and an optical density (OD) of 0.7 to 1.0 based on a light-shielding film thickness of 1.0 μm, and a method for manufacturing the same.

19 Claims, 3 Drawing Sheets

(51) Int. Cl.
*C09C 1/46* (2006.01)
*C09C 1/48* (2006.01)
*G02B 1/04* (2006.01)

(56) References Cited

U.S. PATENT DOCUMENTS

| | | | |
|---|---|---|---|
| 7,626,176 | B2 | 12/2009 | Zeitler et al. |
| 8,154,582 | B2 | 4/2012 | Border et al. |
| 8,329,068 | B2 | 12/2012 | Inoue et al. |
| 9,407,906 | B2 | 8/2016 | Kroon |
| 9,733,421 | B2 | 8/2017 | Zhou |
| 2006/0158114 | A1 | 7/2006 | Moon et al. |
| 2007/0127227 | A1 | 6/2007 | Osawa |
| 2007/0188837 | A1 | 8/2007 | Shimizu et al. |
| 2009/0056791 | A1* | 3/2009 | Pfenninger ............ H01L 31/055 136/247 |
| 2011/0109970 | A1 | 5/2011 | Abe et al. |
| 2011/0200810 | A1* | 8/2011 | Kubota ................... G02B 1/04 428/220 |
| 2012/0264845 | A1 | 10/2012 | Stappers et al. |
| 2014/0010337 | A1 | 1/2014 | Staszewski et al. |
| 2015/0029441 | A1 | 1/2015 | Kang et al. |
| 2015/0277125 | A1 | 10/2015 | Hirano et al. |
| 2015/0378085 | A1* | 12/2015 | Robinson ............ G02B 6/0048 359/464 |
| 2016/0026253 | A1* | 1/2016 | Bradski ................ G02B 27/225 345/8 |
| 2016/0116653 | A1* | 4/2016 | Murayama ........ H01L 27/14618 359/359 |
| 2017/0184931 | A1 | 6/2017 | Zhang et al. |
| 2017/0198157 | A1 | 7/2017 | Park et al. |
| 2017/0293149 | A1 | 10/2017 | Tatsugi |
| 2018/0107050 | A1* | 4/2018 | Barrett .................. G02B 5/205 |
| 2019/0148903 | A1* | 5/2019 | Shohda ................ H01S 3/0621 372/40 |
| 2019/0258107 | A1* | 8/2019 | Fujii .................. B29D 11/0073 |

FOREIGN PATENT DOCUMENTS

| | | |
|---|---|---|
| CN | 101636452 B | 7/2012 |
| CN | 102597137 A | 7/2012 |
| CN | 103135264 A | 6/2013 |
| CN | 104791660 A | 7/2015 |
| CN | 104880879 A | 9/2015 |
| EP | 1766465 A1 | 3/2007 |
| EP | 2135900 A1 | 12/2009 |
| EP | 3414899 A1 | 12/2018 |
| JP | 2007156228 A | 6/2007 |
| JP | 2007219106 A | 8/2007 |
| JP | 2008533484 A | 8/2008 |
| JP | 2009075303 A | 4/2009 |
| JP | 2010008786 A | 1/2010 |
| JP | 2011001538 A | 1/2011 |
| JP | 2015096883 A | 5/2015 |
| JP | 2015184561 A | 10/2015 |
| KR | 200242865 Y1 | 10/2001 |
| KR | 100470321 B1 | 1/2005 |
| KR | 20050078728 A | 8/2005 |
| KR | 20060078613 A | 7/2006 |
| KR | 20090027076 A | 3/2009 |
| KR | 20090027076 A * | 3/2009 |
| KR | 20100088680 A | 8/2010 |
| KR | 20120076973 A | 7/2012 |
| KR | 20150012529 A | 2/2015 |
| KR | 20150016608 A | 2/2015 |
| KR | 20160032823 A | 3/2016 |
| KR | 20160037125 A | 4/2016 |
| KR | 20160091402 A | 8/2016 |
| KR | 20170049269 A | 5/2017 |
| TW | 201631387 A | 9/2016 |
| WO | 2009051673 A1 | 4/2009 |
| WO | 2015081313 A2 | 6/2015 |

OTHER PUBLICATIONS

Korean Search Report for KR10-2016-0170797 dated Nov. 22, 2016.
Taiwanese Search Report from First Office Action for TW106140877 dated Oct. 3, 2018.
International Search Report for PCT/KR2017/013382 dated Feb. 19, 2018.
Search Report from Chinese Office Action for CN2017800601700 dated Jan. 6, 2020; 3 pages.

* cited by examiner

[Fig. 1]
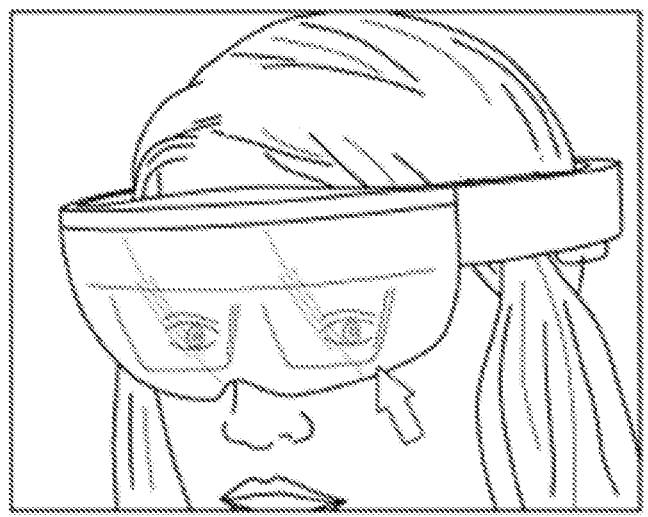
[Fig. 2]
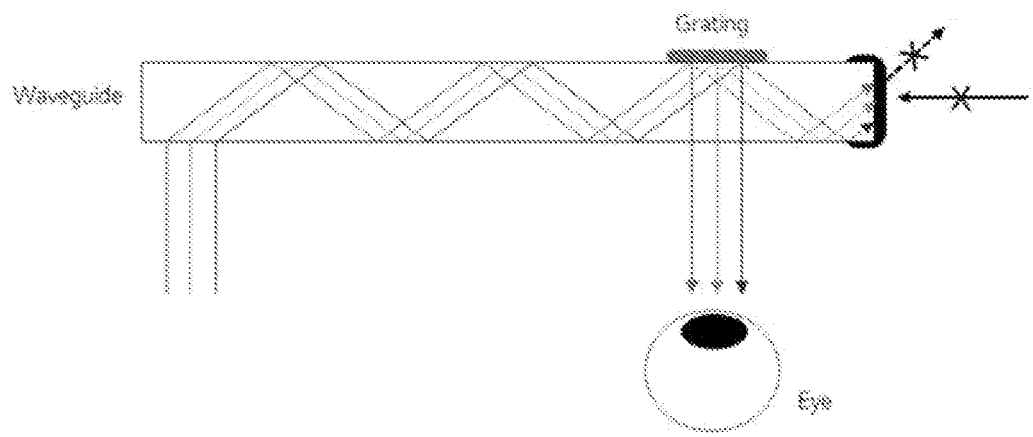

[Fig. 3]
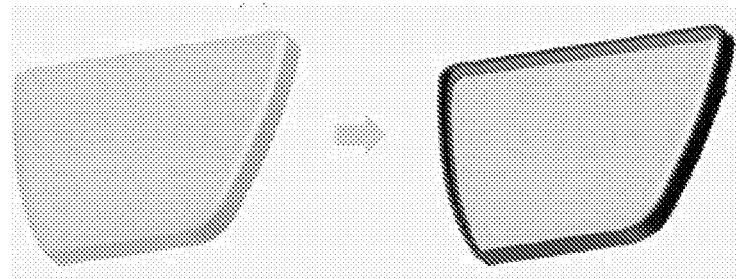
[Fig. 4]
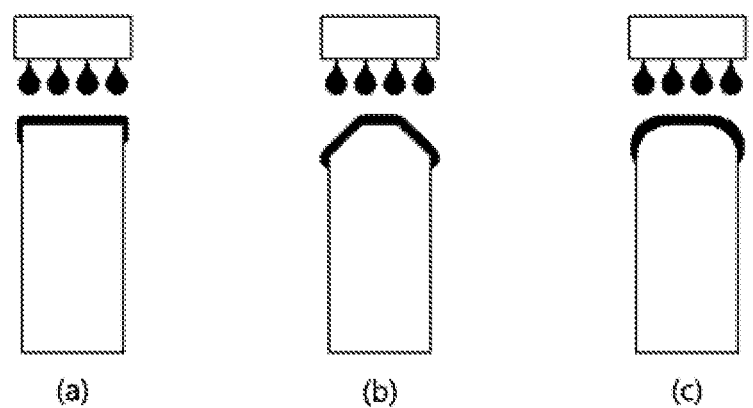
(a)        (b)        (c)
[Fig. 5]

[Fig. 6]
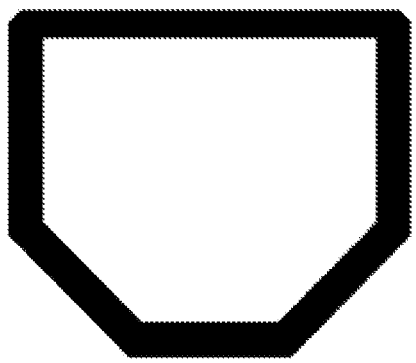

WAVEGUIDE HAVING LIGHT SHIELDING FILM FORMED THEREON AND MANUFACTURING METHOD THEREFOR

REFERENCE TO RELATED APPLICATIONS

The present application is a national phase entry under 35 U.S.C. § 371 of International Application No. PCT/KR2017/013382, filed on Nov. 23, 2017, which claims priority from Korean Patent Application No. 10-2016-0170797, filed on Dec. 14, 2016, the disclosures of which are incorporated herein by reference.

BACKGROUND OF THE INVENTION

1. Field of the Invention

The present invention relates to a waveguide having a light-shielding film, and more particularly, to a waveguide including a light-shielding layer for suppressing light leakage and inflow of external light.

2. Description of the Related Art

A wearable augmented reality device represented by augmented reality (AR) glasses requires a Near-Eye Display (NED) in order to transmit a digital image to the user's eyes. One of the components of the NED is a planar waveguide. The rays of light entering such a waveguide are transmitted in a direction parallel to the waveguide plane and are reflected to a grating or a half-mirror to reach the user's eye. At this time, some rays propagate to the end of the waveguide and diverge to the edge of the waveguide, causing a light leakage phenomenon as seen in FIG. 1 during the operation of NED.

Such light leakage phenomenon should be improved because it reduces user convenience and aesthetics when the product is operated. Also, external light entering from the edge of the waveguide may cause unintended optical interference, which may result in degradation of image quality.

Therefore, a light-shielding coating on the cut edge of the waveguide enables to suppress the inflow of external light, thereby suppressing the degradation of image quality output from the NED. In the past, a waveguide was covered with a plastic case or had a tape attached to its rim to shield the light.

However, in the above methods, the thickness of the light-shielding layer is as thick as several tens of nm to several mm, and it is difficult to control the width of the light-shielding coating to as thin and precise as several hundreds of nm to several μm.

PRIOR ART DOCUMENT

Patent Literature (Patent Document 1) KR 10-2012-0076973 A

SUMMARY OF THE INVENTION

In the case of using ink to form a light-shielding film, it is difficult to coat the narrow cut surface of the waveguide by a conventional means such as contact type printing, for example screen printing. In addition, when the cut surface of the waveguide is processed into a curved surface or an inclined surface, it has been difficult to precisely coat the light-shielding layer by a conventional method. However, the ink-jet printing method, which is a non-contact type printing method, allows to precisely print even in a narrow cut area of which the surface is curved or inclined.

Accordingly, an object of the present invention is to provide a waveguide that prevents light leakage and inflow of external light into the waveguide which occur at the edge of the waveguide, by coating a cut surface of the waveguide with a black ink to form a light-shielding film.

In order to solve the above problems, the present invention provides a waveguide having a light-shielding film with a thickness of 2 to 10 μm having an optical density (OD) of 0.7 to 1.0 based on the light-shielding film of a thickness of 1.0 μm on a cut surface of the edge side of the planar waveguide.

Further, the present invention provides a method for manufacturing the waveguide, comprising the steps of: a) forming a coating layer of a light-shielding film having a thickness of 2 to 10 μm on a cut surface of the edge side of the planar waveguide, using a curable ink composition; and b) curing a pattern of the light-shielding film to form a light-shielding film having an optical density (OD) of 0.7 to 1.0 based on the light-shielding film of a thickness of 1.0 μm.

The present invention also provides a waveguide module including the waveguide.

Effect of the Invention

According to the present invention, even though the light-shielding film is formed with a thin thickness, the light leakage phenomenon and the inflow of external light into the waveguide which is occurred at the edge of the waveguide can be prevented owing to excellent optical density and excellent adhesion force of the light-shielding film.

BRIEF DESCRIPTION OF THE DRAWINGS

FIG. 1 is a schematic diagram showing the use of a waveguide and light leakage phenomenon.

FIG. 2 is a schematic view showing a light traveling path along the waveguide of the present invention.

FIG. 3 is a schematic view illustrating a process of forming the light-shielding film of the waveguide of the present invention.

FIG. 4 is a schematic view showing a method for forming the waveguide according to the shape of the cut surface of the waveguide of the present invention.

FIG. 5 is a schematic view showing a cross section of the waveguide manufactured according to an embodiment of the present invention.

FIG. 6 is a schematic view illustrating a front view of the waveguide manufactured according to an embodiment of the present invention.

DETAILED DESCRIPTION OF THE INVENTION

Hereinafter, the present invention will be described in more detail.

The present invention provides a waveguide on which a light-shielding film is formed on a cut surface of the edge side of the planar waveguide.

For a planar waveguide, incident light is reflected by the inner wall of the waveguide. At this time, if the appropriate light-shielding film is not formed on the cut surface, there arises a problem of light emission (light leakage phenomenon) or unnecessary light may be entered from outside.

The waveguide of the present invention enables to block divergence of internal light and inflow of external light, by forming a light-shielding film with a small thickness having excellent optical density (OD) on the cut surface of the edge side of the planar waveguide, as shown in FIG. 2.

The cut surface of the waveguide on which the light-shielding film is formed may be processed into a flat surface, a curved surface, or an inclined surface. In the present invention, a light-shielding film in various shapes can be formed by a manufacturing method described below.

Further, the light-shielding film may be formed on the lateral face and the lateral edge of the cut surface of the waveguide. By forming the light-shielding film not only on the lateral face but also on the lateral edge, it is possible to block divergence of internal light and block inflow of external light.

The light-shielding film comprises at least one black ink pigment selected from the group consisting of carbon black, graphite, metal oxide and organic black pigment.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); diagram black II, diagram black N339, diagram black SH, diagram black H, diagram LH, diagram HA, diagram SF, diagram N550M, diagram M, diagram E, diagram G, diagram R, diagram N760M, diagram LR, #2700, #2600, #2400, #2350, #2300, #2200, #1000, #980, #900, MCF88, #52, #50, #47, #45, #45L, #25, # CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Co., Ltd.); RAVEN-1100ULTRA, RAVEN-108OUL-TRA, RAVEN-106OULTRA, RAVEN-1040, RAVEN-1035, RAVEN-1020, RAVEN-1000, RAVEN-890H, RAVEN-890, RAVEN-88OULTRA, RAVEN-86OULTRA, RAVEN-850, RAVEN-820, RAVEN-79OULTRA, RAVEN-78OULTRA, RAVEN-760ULTRA, RAVEN-520, RAVEN-500, RAVEN-460, RAVEN-450, RAVEN-43OULTRA, RAVEN-420, RAVEN-410, RAVEN-250OULTRA, RAVEN-2000, RAVEN-1500, RAVEN-1255, RAVEN-1250, RAVEN-1200, RAVEN-1190ULTRA, RAVEN-1170 (Columbia Carbon Co.), mixtures thereof, or the like.

As the organic black pigment, aniline black, lactam black, or perylene black series may be used, but the organic black pigment is not limited thereto.

The content of the black ink pigment may be 10 to 25% by weight based on the total weight of the light-shielding film. The content of the black ink pigment should satisfy the above range to ensure dispersion stability and storage stability of the ink and to produce a light-shielding film having a high optical density per thickness without adversely affecting the UV curing of the film.

As shown in FIG. 3, the waveguide of the present invention can suppress the light leakage and block the inflow of the external light by forming the light-shielding film on the cut surface of the edge side of the waveguide.

For this, as described above, the thickness of the light-shielding film may be 2 to 10 µm, and more preferably 3 to 7 µm. In the prior art of attachment of the light-shielding tape or covering with the case, it has been difficult to form such a light-shielding film with a thin thickness. However, in the present invention, by using the method for manufacturing the waveguide described later, the light leakage can be suppressed and the inflow of external light can be blocked even though the light-shielding film is formed with a thin thickness within the above range.

In addition, the waveguide of the present invention may have a total optical density (OD) of 2.5 or more in order to suppress light leakage and to block the inflow of external light. When the optical density satisfies the above-described range, the shielding property of the light-shielding film is sufficient. It is preferred that the optical density (OD) of the light-shielding film is 0.7 to 1.0 based on the light-shielding film of a thickness of 1.0 µm.

In particular, the optical density (OD) of the light-shielding film having a thickness of 2 to 5 µm may be 0.80 to 1.0 based on the light-shielding film of a thickness of 1.0 µm. The optical density (OD) of the light-shielding film having a thickness of 5 to 10 µm may be 0.70 to 0.90 based on the light-shielding film of a thickness of 1.0 µm. When the optical density (OD) of the light-shielding film satisfies the above-described range, the shielding property of the light-shielding film of the present invention is optimized.

Further, the adhesion force of the light-shielding film to the waveguide may be 4B to 5B. Specifically, the adhesion force may be 4B to 5B according to the ASTM D3359 standard, providing excellent adhesion and coating properties.

The present invention provides a method for producing the waveguide as described above, comprising the steps of: a) forming a coating layer of a light-shielding film on a cut surface of the edge side of the planar waveguide, using a curable ink composition; and b) curing a pattern of the light-shielding film to form a light-shielding film.

The curable ink composition is characterized by comprising a colorant, an epoxy compound, an oxetane compound, a photopolymerization initiator, and a solvent having a boiling point of 190 to 280° C.

The curable ink composition of the present invention may further comprise at least one selected from the group consisting of a surfactant, an adhesion promoter, a diluent, and a photosensitizer.

In usual, a curable ink composition contains a radically polymerizable compound or a cationically polymerizable compound.

For the radically polymerizable compound, it is not suitable for curing the thin film because it has a trouble in curing due to oxygen and it is not suitable for the formation of a light-shielding film due to low adhesion to a glass substrate due to a large amount of curing shrinkage. On the other hand, the cationically polymerizable compound is advantageous for curing the thin film because of low curing shrinkage ratio and less influence by oxygen.

The curable ink composition used in the present invention contains an epoxy compound as a cationically curable component. Specifically, the epoxy compound is at least one or a mixture of the two selected from a bisphenol type epoxy compound, a novolak type epoxy compound, a glycidyl ester type epoxy compound, a glycidylamine type epoxy compound, a linear aliphatic epoxy compound, a biphenyl type epoxy compound and an alicyclic epoxy compound.

The alicyclic epoxy compound may refer to a compound containing at least one epoxidized aliphatic ring group.

In the above-mentioned alicyclic epoxy compound containing an epoxidized aliphatic ring group, the epoxidized aliphatic ring group refers to an epoxy group bonded to an alicyclic ring. Examples thereof include a functional group such as a 3,4-epoxycyclopentyl group, a 3,4-epoxycyclohexyl group, a 3,4-epoxycyclopentylmethyl group, a 3,4-epoxycyclohexylmethyl group, a 2-(3,4-epoxycyclopentyl) ethyl group, a 2-(3,4-epoxycyclohexyl)ethyl group, a 3-(3, 4-epoxycyclopentyl)propyl group or a 3-(3,4-epoxycyclohexyl)propyl group. The hydrogen atom constituting the alicyclic ring may be optionally substituted with a substituent such as an alkyl group. The alicyclic epoxy compound includes the compounds specifically exemplified below, but is not limited to thereto.

There may be used, for example, dicyclopentadiene dioxide, cyclohexene oxide, 4-vinyl-1,2-epoxy-4-vinylcyclohexene, vinylcyclohexene dioxide, limonene monoxide, limonene dioxide, (3,4-epoxycyclohexyl)methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl) adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester, (3,4-epoxycyclohexyl)ethyltrimethoxysilane and Celloxide 8000 (manufactured by Daicel Corporation).

The content of the epoxy compound is preferably 5 to 40% by weight, more preferably 10 to 30% by weight based on the total weight of the curable ink composition. If it exceeds 40% by weight, the viscosity of the composition increases. If it is less than 5% by weight, the curing sensitivity is deteriorated.

The curable ink composition contains an oxetane compound as another cationically polymerizable monomer.

The oxetane compound, which is a compound having a quaternary cyclic ether group in the molecular structure, may serve to lower the viscosity of the cationically cured ink composition (for example, less than 50 cPs at 25° C.).

In particular, there may be exemplified by 3-ethyl-3-hydroxymethyloxetane, 1,4-bis[(3-ethyl-3-oxetanyl) methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyloxetane or phenol novolak oxatane. Examples of the oxetane compound include "Alon oxetane OXT-101", "Alon oxetane OXT-121", "Alon oxetane OXT-211", "Alon oxetane OXT-221", "Alon oxetane OXT-212" and the like. These may be used alone or in combination of two or more.

The content of the oxetane compound is preferably 20 to 70% by weight, and more preferably 40 to 60% by weight based on the total weight of the curable ink composition. If it is more than 70% by weight, the curing sensitivity is low, and if it is less than 20% by weight, the viscosity increases and coating properties be deteriorated.

The oxetane compound of the present invention can be used in combination with an oxetane compound having one oxetane ring and an oxetane compound having two oxetane rings. When the oxetane compound having one oxetane ring and the oxetane compound having two oxetane rings are used together, there are advantages in that the viscosity and flexibility of the film can be controlled. When two types of oxetane compounds are used together as described above, it is preferred that the content ratio of the oxetane compound having one oxetane ring: the oxetane compound having two oxetane rings is in the range of 1:16 to 1:3.

The ink composition of the present invention comprises a compound which produces a cationic species or a Bronsted acid by irradiation of UV rays as a cationic photopolymerization initiator, for example, an iodonium salt or a sulfonium salt, but not limited thereto.

The iodonium salt or sulfonium salt causes a curing reaction in which monomers having an unsaturated double bond contained in ink are reacted to form a polymer during the UV curing process. A photosensitizer may also be used according to the polymerization efficiency.

As an example, the photopolymerization initiator may be a photopolymerization initiator having an anion represented by $SbF_6^-$, $AsF_6^-$, $BF_6^-$, $(C_6F_5)_4B^-$, $PF_6^-$ or $RfnF_{6-n}$, but is not limited thereto.

The photopolymerization initiator is preferably contained in an amount of 0.5 to 10% by weight based on the total weight of the curable ink composition. When the content of the photopolymerization initiator is less than 0.5% by weight, the curing reaction is not sufficient. When the content of the photopolymerization initiator is more than 10% by weight, the photopolymerization initiator is not completely dissolved or the viscosity is increased, and as a result, the coatability may be deteriorated.

The ink composition may contain a solvent having a boiling point of 190 to 280° C. in order to improve the coatability by decreasing the viscosity of the ink to increase the fluidity and to prevent the decrease of the light shielding density per unit thickness, more preferably 210 to 260° C. By using the solvent having a boiling point of 190 to 280° C. as described above, drying of the nozzle during inkjet printing and a decrease in the curing rate may not be occurred, so that there may be no problem in curing of the coating film.

In the present invention, one or more selected from the group consisting of alcohol, glycol and glycol ether having a boiling point of 190 to 280° C. may be used as the solvent.

The glycol ether having a boiling point of 190 to 280° C. may be alkylene glycol alkyl ether having 1 to 6 carbon atoms in the alkyl glycol moiety, more preferably ethylene glycol alkyl ether, diethylene glycol alkyl ether, triethylene glycol alkyl ether, tetraethylene glycol alkyl ether, propylene glycol alkyl ether, dipropylene glycol alkyl ether, and glycol dialkylene ether, and most preferably, monoalkyl ether having one alkyl group having 1 to 4 carbon atoms or dialkyl ether having two alkyl groups having 1 to 4 carbon atoms in the alkyl ether moiety.

The content of the solvent is preferably 1 to 40% by weight based on the total weight of the curable ink composition. If the content of the solvent is more than 40% by weight, the curing sensitivity may be deteriorated.

The curable ink composition contains a colorant.

The colorant may be used in the form of a pigment dispersion containing one or more pigments, dyes, or a mixture thereof, and is not particularly limited as long as it can express required colors.

In one embodiment of the invention, carbon black, graphite, metal oxide, organic black pigment and the like can be used as the pigment.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); diagram black II, diagram black N339, diagram black SH, diagram black H, diagram LH, diagram HA, diagram SF, diagram N550M, diagram M, diagram E, diagram G, diagram R, diagram N760M, diagram LR, #2700, #2600, #2400, #2350, #2300, #2200, #1000, #980, #900, MCF88, #52, #50, #47, #45, #45L, #25, # CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Co., Ltd.); RAVEN-1100ULTRA, RAVEN-108OULTRA, RAVEN-106OULTRA, RAVEN-1040, RAVEN-1035, RAVEN-1020, RAVEN-1000, RAVEN-890H, RAVEN-890, RAVEN-88OULTRA, RAVEN-86OULTRA, RAVEN-850, RAVEN-820, RAVEN-79OULTRA, RAVEN-78OULTRA, RAVEN-760ULTRA, RAVEN-520, RAVEN-500, RAVEN-460, RAVEN-450, RAVEN-43OULTRA, RAVEN-420, RAVEN-410, RAVEN-250OULTRA, RAVEN-2000, RAVEN-1500, RAVEN-1255, RAVEN-1250, RAVEN-1200, RAVEN-1190ULTRA, RAVEN-1170 (Columbia Carbon Co.), mixtures thereof, or the like.

As the organic black pigment, aniline black, lactam black, or perylene black series may be used, but the organic black pigment is not limited thereto.

In the present invention, the curable ink composition is cured by irradiation with ultraviolet radiation (e.g., 250 or 450 nm), more preferably with ultraviolet radiation having a long wavelength (e.g., 360 to 410 nm) to achieve a certain level of OD. For this purpose, the content of the colorant may be preferably 5 to 20% by weight, more preferably 3 to 10% by weight based on the total weight of the curable ink composition. If the content of the colorant is less than 5% by weight, a level of OD applicable to the light-shielding film may not be obtained. If it exceeds 20% by weight, an excessive amount of colorant may not be dispersed in the ink, so that precipitates may be formed, or ultraviolet radiation may not penetrate into the film after coating, so that the film may not be sufficiently cured.

The curable ink composition contains a surfactant that lowers the surface tension of the ink composition to exhibit a small taper angle.

As the surfactant, commercially available products can be used, for example it may be selected from the group consisting of Megafack F-444, F-475, F-478, F-479, F-484, F-550, F-552, F-553, F-555, F-570 and RS-75 from DIC (DaiNippon Ink & Chemicals), or Surflon S-111, S-112, S-113, S-121, S-131, S-132, S-141 and S-145 from Asahi Glass Co., Ltd., or Fluorad FC-93, FC-95, FC-98, FC-129, FC-135, FC-170C, FC-430 and FC-4430 from Sumitomo 3M Co., Ltd., or Zonyl FS-300, FSN, FSN-100 and FSO from DuPont, or BYK-306, BYK-310, BYK-320, BYK-330, BYK-331, BYK-333, BYK-342, BYK-350, BYK-354, BYK-355, BYK-356, BYK-358N, BYK-359, BYK-361N, BYK-381, BYK-370, BYK-371, BYK-378, BYK-388, BYK-392, BYK-394, BYK-399, BYK-3440, BYK-3441, BYKETOL-AQ, BYK-DYNWET 800, BYK-SILCLEAN 3700 and BYK-UV 3570 from BYK, or Rad 2100, Rad 2011, Glide 100, Glide 410, Glide 450, Flow 370 and Flow 425 from TEGO, etc.

The surfactant is preferably contained in an amount of 0.1 to 5.0% by weight, more preferably 0.5 to 3.0% by weight based on the total weight of the curable ink composition. When the content of the surfactant is less than 0.1% by weight, the effect of lowering the surface tension of the composition is insufficient, resulting in coating failure when the composition is coated on the substrate. When the content exceeds 5.0% by weight, the surfactant may be used in an excessive amount, resulting in a problem that the compatibility and defoaming property of the composition are rather reduced.

The curable ink composition may further comprise a photosensitizer to compensate the curing property on active energy ray with long wavelength.

The photosensitizer may be at least one selected from the group consisting of anthracene-based compounds such as anthracene, 9,10-dibutoxy anthracene, 9,10-dimethoxy anthracene, 9,10-diethoxy anthracene and 2-ethyl-9,10-dimethoxy anthracene; benzophenone-based compounds such as benzophenone, 4,4-bis(dimethylamino)benzophenone, 4,4-bis(diethylamino)benzophenone, 2,4,6-trimethylaminobenzophenone, methyl-o-benzoylbenzoate, 3,3-dimethyl-4-methoxybenzophenone and 3,3,4,4-tetra(t-butylperoxycarbonyl)benzophenone; acetophenone; ketone-based compounds such as dimethoxyacetophenone, diethoxyacetophenone, 2-hydroxy-2-methyl-1-phenylpropan-1-one and propanone; perylene; fluorenone-based compounds such as 9-fluorenone, 2-chloro-9-fluorenone and 2-methyl-9-fluorenone; thioxanthone-based compounds such as thioxanthone, 2,4-diethyl thioxanthone, 2-chloro thioxanthone, 1-chloro-4-propyloxy thioxanthone, isopropyl thioxanthone (ITX), diisopropyl thioxanthone; xanthone-based compounds such as xanthone and 2-methylxanthone; anthraquinone-based compounds such as anthraquinone, 2-methyl anthraquinone, 2-ethyl anthraquinone, t-butyl anthraquinone and 2,6-dichloro-9,10-anthraquinone; acridine-based compounds such as 9-phenylacridine, 1,7-bis(9-acridinyl)heptane, 1,5-bis(9-acridinylpentane) and 1,3-bis(9-acridinyl) propane; dicarbonyl compounds such as benzyl, 1,7,7-trimethyl-bicyclo[2,2,1]heptane-2,3-dione and 9,10-phenanthrenequinone; phosphine oxide-based compounds such as 2,4,6-trimethylbenzoyldiphenylphosphine oxide and bis(2,6-dimethoxybenzoyl)-2,4,4-trimethylpentylphosphine oxide; benzoate-based compounds such as methyl-4-(dimethylamino)benzoate, ethyl-4-(dimethylamino)benzoate and 2-n-113 butoxyethyl-4-(dimethylamino)benzoate; amino synergists such as 2,5-bis(4-diethylaminobenzal)cyclopentanone, 2,6-bis(4-diethylaminobenzal)cyclohexanone, and 2,6-bis(4-diethyaminobenzal)-4-methyl-cyclopentanone; coumarin-based compounds such as 3,3-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin and 10,10-carbonylbis[1,1,7,7-tetramethyl-2,3,6,7-tetrahydro-1H,5H,11H-C1]benzopyrano[6,7,8-ij]quinolizin-11-one; chalcone compounds such as 4-diethylaminochalcone and 4-azidobenzalacetophenone; 2-benzoylmethylene; and 3-methyl-b-naphthothiazoline.

The photosensitizer is preferably contained in an amount of 1 to 200 parts by weight, more preferably 10 to 100 parts by weight, based on 100 parts by weight of the photopolymerization initiator. If the amount is less than 1 part by weight, a synergistic effect of curing sensitivity at a desired wavelength may not be obtained. If the amount is more than 200 parts by weight, the photosensitizer may not be dissolved and the adhesive strength and crosslinking density of the pattern may be lowered.

The curable ink composition may further comprise an adhesion promoter as an additive.

The light-shielding film attached to the cut surface of the waveguide repeatedly shrinks and expands depending on the conditions of use such as temperature and humidity, so that the light-shielding film may be stressed and may be removed from the waveguide. In order to prevent this, at least one silane compound selected from the group consisting of an alkoxysilane compound, an epoxy silane compound, an aminophenyl silane compound, an aminosilane compound, a mercapto silane compound and a vinyl silane compound may be used as the adhesion promoter.

Of these, an epoxy silane compound is more preferable as the adhesion promoter of the present invention.

The adhesion promoter is preferably contained in an amount of 0.1 to 15% by weight, more preferably 2 to 10% by weight based on the total weight of the ink composition. If the amount is less than 0.1% by weight, the light-shielding film cannot be prevented from peeling off from the cut surface of the waveguide. If the amount is more than 15% by weight, the viscosity of the ink solution increases and the dispersibility is low.

The curable ink composition used in the present invention spreads within a short time after application, exhibits excellent coating properties, and exhibits excellent adhesion properties by curing. Therefore, when the curable ink composition is used for an inkjet printer, it is preferable to provide a UV lamp just behind the inkjet head so that curing can be performed simultaneously with inkjet printing. The curable ink composition has a curing dose of 1 to 10,000 mJ/cm$^2$, preferably 80 to 2,000 mJ/cm$^2$. The curable ink composition is cured by absorbing ultraviolet radiation in a wavelength range of 250 nm to 450 nm, preferably 360 nm to 410 nm.

The curable ink composition, for example, having a viscosity of 1 to 20 mPa·s at 25° C. is suitable for an inkjet process. The curable ink composition having the viscosity range described above has good ejection at the process temperature. The process temperature means a temperature heated in order to lower viscosity of the curable ink composition. The process temperature may be from 10° C. to 100° C., and preferably from 20° C. to 70° C.

In addition, when the curable ink composition is evaporated, for example, in a convection oven at 35° C., the residual mass after 2 hours may be 85% or more, so that the curing rate and film characteristics are not deteriorated while the evaporation rate is low.

Inkjet printing or dispensing process may be used to form a coating layer of the light-shielding film on the cut surface of the edge of the planar waveguide in step a). The inkjet printing method can be performed in a conventional manner. The dispensing process may use a pneumatic or piezoelectric dispensing valve as the micro-dispensing device. It is preferable to use an inkjet printing method.

The inkjet printing method allows the coating layer of the light-shielding film to be effectively formed on the cut surface of the edge side of the waveguide which is processed into a curved surface (FIG. 4 (b) or an inclined surface (FIG. 4 (c)) as well as the flat surface (FIG. 4 (a)), as shown in FIG. 4.

The curing in step b) may be UV curing. For the UV curing, a light source with a wavelength of 250 to 450 nm, more preferably of 360 to 410 nm, may be used as a light source.

Further, the thickness of the light-shielding film produced by the above method may be 2 to 10 μm, preferably 3 to 7 μm.

The optical density (OD) of the light-shielding film produced by the above method may be 0.7 to 1.0 based on the light-shielding film of a thickness of 1.0 μm. The optical density (OD) of the light-shielding film having a thickness of 2 to 5 μm may be 0.8 to 1.0 based on the light-shielding film of a thickness of 1.0 μm. The optical density (OD) of the light-shielding film having a thickness of 5 to 10 μm may be 0.7 to 0.9 based on the light-shielding film of a thickness of 1.0 μm.

The adhesion force of the light-shielding film produced by the above method to the waveguide may be 4B to 5B.

The cut surface of the edge side of the waveguide on which the light-shielding film is formed may be processed into a flat surface, a curved surface, or an inclined surface. The light-shielding film may be formed on the lateral face and the lateral edge of the cut surface of the waveguide.

The present invention also provides a waveguide module comprising the waveguide.

The waveguide module is not particularly limited as long as the waveguide of the present invention is used, but it can be used for augmented reality (AR) glasses and the like.

The present invention will be explained in more detail with reference to the following examples, including comparative examples. However, these examples are provided for illustrative purposes only and are not intended to limit the scope of the invention.

EXAMPLES

Preparation Example 55 wt % of a carbon black pigment dispersion (BK-5282, manufactured by Tokushiki Co., Ltd., pigment content: 25 wt %), 5 wt % of 3,4-epoxycyclohexyl carboxylate (TTA-21P, manufactured by JIANGSU TETRA NEW MATERIAL TECHNOLOGY CO., LTD.) as an epoxy compound, 15 wt % of 3-ethyl-3-[(2-ethyl hexyloxy)methyl]oxetane (GASON® DOX, manufactured by Guarson Chemical Co., Ltd.) as an oxetane compound, 1 wt % of UVI-6992 (manufactured by Dow Chemical Company) as a photoinitiator, 1 wt % of KBM-303 (2-(3,4-epoxycyclohexyl)ethyltrimethoxysilane, manufactured by Shin Etsu Silicone) as an adhesion promoter, and 23 wt % of DEGDBE (Diethyl glycol dibutyl ether, boiling point: 251° C.) as a solvent were mixed to prepare a composition for forming the light-shielding film.

Example 1

The composition prepared in the above Preparation Example was coated on the cut surface of the edge of the cleaned waveguide by inkjet coating to have a thickness after curing of 4 μm. In order to prevent foreign matter from adhering, the coating layer was cured by irradiating ultraviolet rays under the following conditions within 1 minute to form a coating layer of the light-shielding film. As a UV irradiator, a high-pressure mercury lamp was used and irradiated with UV dose of 1000 mJ/cm$^2$.

Example 2

The composition prepared in the above Preparation Example was coated on the cut surface of the edge of the cleaned waveguide by inkjet coating to have a thickness after curing of 9 μm. In order to prevent foreign matter from adhering, the coating layer was cured by irradiating ultraviolet rays under the following condition within 1 minute to form a coating layer of the light-shielding film. As a UV irradiator, a high-pressure mercury lamp was used and irradiated with UV dose of 1000 mJ/cm$^2$.

Comparative Example 1

Agfa Jeti KM black ink, which is a commercially available UV curable light-shielding ink composition, was coated on the cut surface of the edge of the cleaned waveguide by roller coating to have a thickness after curing of 80 μm. In order to prevent foreign matter from adhering, the coating layer was cured by irradiating ultraviolet rays under the following condition within 1 minute to form a coating layer of the light-shielding film. As a UV irradiator, a high-pressure mercury lamp was used and irradiated with UV dose of 1000 mJ/cm$^2$.

EXPERIMENTAL EXAMPLES

<Experimental Example 1> Evaluation of OD for Light-Shielding Film

The OD of the light-shielding film manufactured to have the same thickness by using the same method as in Examples 1 and 2 and Comparative Example 1 on the waveguide plane was measured with an optical density meter of X-rite, and the results are shown in Table 1 below.

<Experimental Example 2> Cross Hatch Adhesion Force

A cross-cut test was conducted in accordance with ASTM D3359, which is a cross-cut test standard, on the light-shielding film manufactured to have the same thickness by using the same method as in Examples 1 and 2 and Comparative Example 1 on the waveguide plane. Specifically, 11 lines were drawn on the specimens at intervals of 1 mm in the transverse and longitudinal directions, respectively, resulting in 100 square lattices of 1 mm in width and 1 mm in length. Then, CT-24 adhesive tape of Nichiban Co., Ltd. was attached to the cut surface. When the adhesive tape was peeled off, the state of the surface that detached with the adhesive tape was evaluated according to the following criteria. The results are shown in Table 1 below.
<Evaluation Criteria of Cross Hatch Adhesion Force>
5B: None of area is detached.
4B: less than 5% with respect to the total area is detached.
3B: 5% to 15% with respect to the total area is detached.
2B: 15% to 35% with respect to the total area is detached.
1B: 35% to 65% with respect to the total area is detached.
0B: Most of area is detached.

TABLE 1

|  | Thickness | Optical density/ Thickness | Adhesion force |
|---|---|---|---|
| Example 1 | 4 μm | 0.90/1.0 μm | 5B |
| Example 2 | 9 μm | 0.85/1.0 μm | 5B |
| Comparative Example 1 | 80 μm | 0.037/1.0 μm | 1B |

From the results shown in Table 1, the optical densities in Examples 1 and 2 using the ink composition according to the present invention were as high as 0.90 and 0.70 based on the light-shielding film with a thickness of 1.0 μm, respectively. Therefore, it is possible to manufacture a light-shielding layer having an optical density of 3 or more as a whole even if the light-shielding layer has a thickness of 10 μm or less. On the other hand, in Comparative Example 1 using the conventional ink composition, the optical density based on the light-shielding film with a thickness of 1.0 μm is as low as 0.037. Therefore, a light-shielding layer should be manufactured with a thickness of 80 μm in order to obtain an optical density of 3.0. That is, it was found that a light-shielding layer having a high optical density with a thin thickness of about 1/10 of that of Comparative Example 1 can be formed by using the method of Example 1 and Example 2.

Further, in the case of the light-shielding layer prepared in Example 1 and Example 2, the adhesive force of 5B is achieved without any heat treatment. On the other hand, the light-shielding layer prepared in Comparative Example 1 exhibited an adhesive force of 1B. It was demonstrated that the light-shielding layers prepared in Examples 1 and 2 are superior to the conventional materials in terms of adhesion force.

What is claimed is:

1. A waveguide comprising:
a light-shielding film which is formed on a cut surface of an edge side of the planar waveguide,
wherein the light shielding film has a thickness of 3 to 10 μm, and an optical density (OD) of the light shielding film is 0.7 to 1.0 based on a light-shielding film thickness of 1.0 μm.

2. The waveguide according to claim 1, wherein the light-shielding film comprises at least one black ink pigment selected from the group consisting of carbon black, graphite, metal oxide and organic black pigment.

3. The waveguide according to claim 1, wherein a content of a black ink pigment is 10 to 25% by weight based on a total weight of the light-shielding film.

4. The waveguide according to claim 1, wherein the thickness of the light-shielding film is 3 to 7 μm.

5. The waveguide according to claim 1, wherein the optical density (OD) of the light-shielding film having a thickness of 3 to 5 μm is 0.80 to 1.0 based on the light-shielding film thickness of 1.0 μm.

6. The waveguide according to claim 1, wherein the optical density (OD) of the light-shielding film having a thickness of 5 to 10 μm is 0.70 to 0.90 based on the light-shielding film thickness of 1.0 μm.

7. The waveguide according to claim 1, wherein an adhesion force of the light-shielding film of the waveguide is 4B to 5B.

8. The waveguide according to claim 1, wherein the cut surface of the waveguide on which the light-shielding film is formed is a flat surface, a curved surface, or an inclined surface.

9. The waveguide according to claim 1, wherein the light-shielding film is formed on a lateral face and a lateral edge of the cut surface of the waveguide.

10. A method for manufacturing a waveguide, comprising:
a) coating a curable ink composition to a thickness of 2 to 10 μm on a cut surface of an edge side of the planar waveguide to form a coating layer of a light shielding film; and
b) curing the coating layer to form a light-shielding film having an optical density (OD) of 0.7 to 1.0 based on the light-shielding film thickness of 1.0 μm, wherein the light-shielding film has a thickness of 2 to 10 μm, wherein the coating is carried out by an inkjet printing or dispensing process.

11. The method for manufacturing the waveguide according to claim 10, wherein the curable ink composition comprises a colorant, an epoxy compound, an oxetane compound, a photopolymerization initiator, and a solvent having a boiling point of 190 to 280° C.

12. The method for manufacturing the waveguide according to claim 10, wherein the curing in step (b) is UV curing.

13. The method for manufacturing the waveguide according to claim 10, wherein the thickness of the light-shielding film is 3 to 7 µm.

14. The method for manufacturing the waveguide according to claim 10, wherein the optical density (OD) of the light-shielding film having a thickness of 2 to 5 jam is 0.8 to 1.0 based on the light-shielding film thickness of 1.0 µm.

15. The method for manufacturing the waveguide according to claim 10, wherein the optical density (OD) of the light-shielding film having a thickness of 5 to 10 inn is 0.7 to 0.9 based on the light-shielding film thickness of 1.0 µm.

16. The method for manufacturing the waveguide according to claim 10, wherein an adhesion force of the light-shielding film of the waveguide is 4B to 5B.

17. The method for manufacturing the waveguide according to claim 10, wherein the cut surface of the waveguide on which the light-shielding film is formed is processed into a flat surface, a curved surface, or an inclined surface.

18. The method for manufacturing the waveguide according to claim 10, wherein the light-shielding film is formed on a lateral face and a lateral edge of the cut surface of the waveguide.

19. A waveguide module comprising the waveguide according to claim 1.

* * * * *